United States Patent [19]

Van Cleave

[11] 4,245,534

[45] Jan. 20, 1981

[54] SLITTER FOR SHEET METAL OR THE LIKE

[75] Inventor: Eugene H. Van Cleave, Orchard Lake, Mich.

[73] Assignee: Van Mark Products Corporation, Farmington Hills, Mich.

[21] Appl. No.: 62,955

[22] Filed: Aug. 2, 1979

[51] Int. Cl.³ ................................................ B23D 19/04
[52] U.S. Cl. ........................................ 83/500; 83/495; 83/665; 83/859
[58] Field of Search .................................. 83/500–503, 83/495, 859, 665

[56] References Cited

U.S. PATENT DOCUMENTS 2,698,661  1/1955  MacQuarrie ..................... 83/503 X
3,359,842  12/1967  Young ............................. 83/500

*Primary Examiner*—J. M. Meister
*Attorney, Agent, or Firm*—Hiram P. Settle

[57] ABSTRACT

A sheet metal slitter of the type having a pair of parallel shafts journalled at spaced axial points and a slitter roll on each shaft, the rolls cooperatively defining a cutting nip. The invention resides in a bearing assembly with bearings cantilevered from a support element. The bearings are positioned, respectively, adjacent the pair of slitter rolls on the shafts to resist forces tending to separate the shafts during metal cutting. The support element is slotted to accommodate the cut portions of the workpiece without spreading or tearing and with substantially no bending.

20 Claims, 4 Drawing Figures

U.S. Patent     Jan. 20, 1981     4,245,534
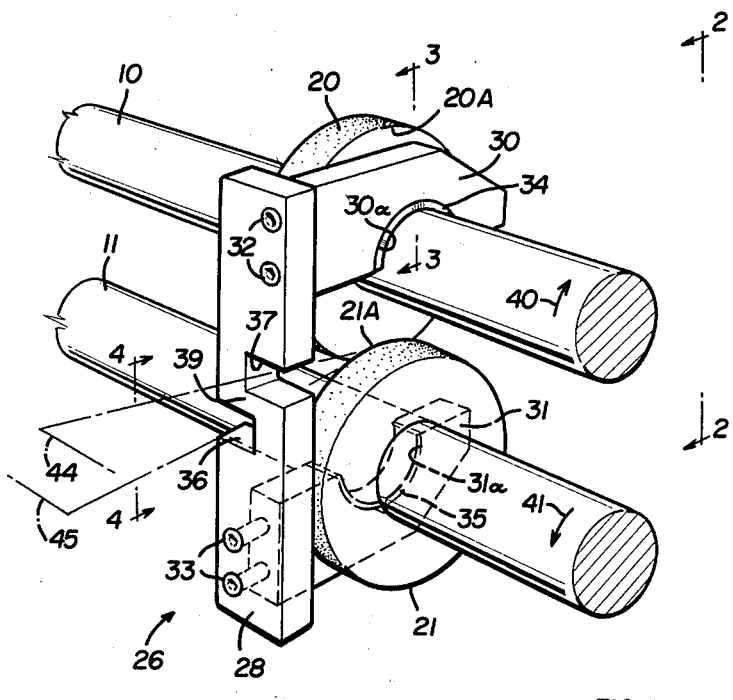
FIG. 1
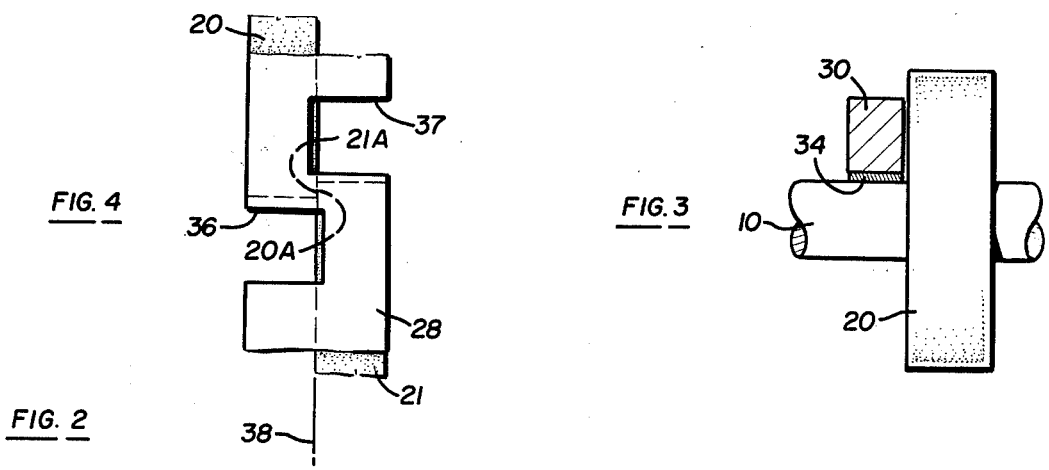
FIG. 4    FIG. 3
FIG. 2
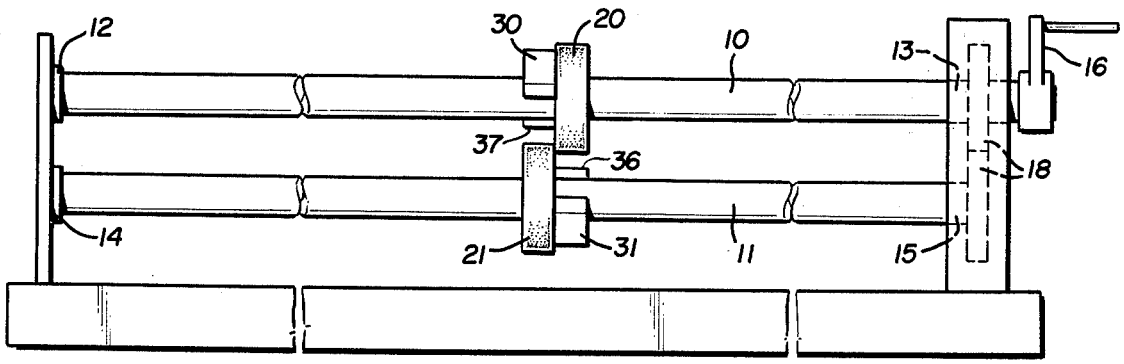

SLITTER FOR SHEET METAL OR THE LIKE

BACKGROUND OF THE INVENTION

The invention relates to slitters for sheet metal or the like.

One of the presently common type of sheet metal slitters or cutters employs a pair of shafts with parallel axes each journalled at spaced axial points. One or more pairs of cutters are placed on the shafts, each comprising a pair of abutting cutter wheels having circular cutting edges and mounted on the respective shafts to cut a workpiece as it passes between the shafts. One of the shafts may be a drive shaft and the other a driven shaft. One of the advantages of cutters of this type is that a pair of cutters may be moved to any axial position to cut the sheet metal into any desired width within the limits of the shaft lengths. Another advantage is that more than one cut may be made at a time on the workpiece by using more than one pair of cutters on the shafts.

One of the problems associated with this type of sheet metal cutter is that substantial separation forces are exerted upon the cutters as the sheet metal passes between them. These forces tend to separate the shafts, thereby preventing clean cutting and exerting large wearing forces on the journals at the end of the shaft. The forces of separation also tend to bend or spring the shafts themseleves. Not only is there a resultant wear, with possibilities of distortion of the material of the cutter, but the accuracy of the cutters is also effected.

A somewhat different type of cutter is described in U.S. Pat. No. 1,098,671 granted June 2, 1914, to Lundy for "Sheet Material Cutter", this type of cutter having a U-shaped holder which supports a pair of journalled cutter wheels. In the Lundy U-shaped holder, a pair of slots extend from each side of the holder so that the material, after being cut by the cutter wheels, may pass substantially without tearing or distortion. Nevertheless, in the Lundy cutter only one cut may be made at a time, and the cutter is manipulated manually.

U.S. Pat. No. 679,566 granted July 30, 1901 to Kling for "Metal-Shearing Machine" describes a cutting machine having a pair of cutters held on a single somewhat U-shaped frame, the cutters being driven and in this case the metal instead of passing through slots, passes along guideways, one of which is rather ramp-like in an effort to avoid the tearing of the separated metal.

U.S. Pat. No. 3,126,780 granted Mar. 31, 1964 to Booth for "Sheet Metal Cutting Machine" involves a single cutter although driven by drive shafts which are journalled at their ends, the cutters being located beyond the journals of the drive shafts.

U.S. Pat. No. 2,084,967 granted June 22, 1937 to Babb for "Mechanism for Cutting Sheet Material" and U.S. Pat. No. 2,208,022, granted July 16, 1940 to Dworchuck et al. for "Machine for Cutting Sheet Metal" describe apparatus with single cutters.

Other patents relate to cutters which involve a pair of shafts journalled at their ends on which are mounted paired cutting wheels suitably positioned to cut the sheet metal passing through the shafts at desired spacings. For example, U.S. Pat. No. 91,512, granted June 22, 1869 to Briggs for "Machine for Shearing Metal" and U.S. Pat. No. 813,071 granted Feb. 20, 1906 to Abbott for "Metal Cutting Machine" illustrate machines of this character. Other patents are U.S. Pat. No. 3,195,388 granted July 20, 1965 to Neidigh for "Portable Machine Tool". In these machines there are no means to support the shafts against the opposing forces which occur upon the cutting of the metal tending to spread the shafts apart other than the journals at the ends of the shafts. U.S. Pat. No. 2,777,521 granted Jan. 15, 1957 to Tanis for "Sheet Slitting" machine and U.S. Pat. No. 1,678,186, granted July 25, 1928 to Hoelzel for "Pattern Cutter" do not deal with the problem of the opposing forces tending to spread the shafts apparently because these are not so great as to create a serious problem. A cutting mechanism is described in U.S. Pat. No. 1,723,660 granted Aug. 6, 1929 to Ross for "Cutting Mechanism" which is related more to the problem of supplying a gripping to the material being cut through the cutters.

SUMMARY OF THE INVENTION

The invention is related to a slitter or cutter of the type having one or more pairs of shafts with parallel axes each journalled at spaced axial points. A pair of cutter wheels with circular abutting cutting edges in a common radial plane are mounted on the shafts for cutting a workpiece. The cutter also comprises a support element on one side of the wheels, and a pair of bearings for the shafts cantilevered from the element to project into alignment with the adjacent shaft, each such bearing contacts its respective shaft adjacent the cutter wheel thereon in radial opposition to the cutter wheel on the other shaft. The support element further has a pair of slots each open respectively from opposite axial sides of the element and each extending in the axial direction at least to the common radial plane of the cutting edges and so positioned that the metal, as it is cut, passes through the slots without spreading or distortion of the metal.

The bearings may advantageously be removably connected to the element if desired. The shafts are cylinderical and the bearings semicylindrical, and the bearings preferably have friction reducing inserts or sleeves contacting the shafts.

DESCRIPTION OF THE DRAWINGS

The various objects, advantages, and novel features of the invention will be better understood from the following detailed description when read in connection with the accompanying drawings in which:

FIG. 1 is a partial perspective view of an embodiment of the invention showing particularly a bearing assembly applied to a pair of shafts of the cutter carrying a pair of cutter wheels;

FIG. 2 is a front view, as viewed in the direction of the arrows 2—2 of FIG. 1, of the embodiment of the invention from which the perspective of FIG. 1 is derived;

FIG. 3 is a partial sectional view along the lines 3—3 of FIG. 1; and

FIG. 4 is a partial rear view along the lines 4—4 of FIG. 1.

DETAILED DESCRIPTION

A pair of shafts 10, 11 are respectively journalled at their ends, at 12, 13 for shaft 10 and at 14, 15 for shaft 11. A manual crank 16 drives shaft 10, which, through suitable gearing 18 causes the shaft 11 also to be driven in the opposite direction. Although the manual crank is shown for driving the shaft 10, it will be understood that any suitable mechanical or electrical drive means may be employed.

At least one pair of cutter wheels 20 and 21 are mounted respectively on shafts 10, 11 with their respective cutting edges 20A and 21A in abutting relation along a common radial plane. The cutter wheels may be fastened to the shafts 10, 11 by any suitable means. For example, the shafts may be splined (not shown) or a set screw such as 22 in shaft 20, (FIG. 3) may be employed, or both, or any suitable keying or fastening device may be used. Although only one pair 20, 21 of cutter wheels are illustrated, more than one pair may be spaced as desired along the shafts 10, 11.

A bearing assembly 26 comprises a tension or bridging element 28 which in this instance takes the form of a rectangular cross-section post to which are removably cantilevered a pair of bearing arms 30, 31 having arcuate recesses 30a, 31a. An antifriction lining or insert may be employed to face the semicylindrical bearing surface, such as inserts 34, 35 for the bearings 30, 31 respectively. The inserts may be of any suitable bearing metal and may be secured in the ordinary mechanical fashion, or, if desired, graphite or other material may be used. The inserts are of low friction material, that is, they provide a lower coefficient of friction between insert and shaft than between the arm material and the shaft, and so less than would occur without the inserts. The lining or insert may be fastened to the internal semicylindrical wall by a suitable adhesive or by a lip at the edge of the wall (not illustrated), or in any suitable fashion.

The element or post 28 has two slots 36, 37 which extend inward from opposite axial sides of the element 28 and beyond the common radial plane 38 of the abutting cutting edges 20a, 21a, leaving a web 39 between the slots joining the remaining portions of the element 28.

There may be as many of the bearing assemblies 26 comprising the elements 28 and the bearings 30, 31 cantilevered therefrom, as there are pairs of cutter wheels 20, 21. If the cylindrical walls extended more than 180° or were more than semicylindrical in extent, it would be necessary to disassemble the shafts and insert the bearings 30, 31 from the ends of the shafts, and apply the wheels 20, 21 afterwards. It is much more convenient, therefore, to use bearings having bearing surfaces which do not exceed 180° in extent for the bearing walls of the bearings 30, 31, in this case being semicylindrical. Then by loosening the screws 32, 33 or removing them if necessary. The bearings may be suitably applied even though the cutter wheels 20, 21 are already in position, or removed and reapplied if the cutter wheels are moved. As many bearing assemblies as there are pairs of cutter wheels may be employed suitably positioned adjacent the cutter wheels 20, 21.

In operation when a piece of metal is to be cut, it may be assumed that a suitable guide (not shown) may be used at one axial side of the shafts to control the width of the cut on the sheet metal. As the drive shaft 10 is turned by the action of the handle 16 in the direction of the arrow 40, the driven shaft 21 is driven in the opposite direction, so that the metal applied against the cutter wheels 20, 21 tends to be drawn from the side opposite the element 28 between the shafts 10, 11 toward the element 28 on the other side. On being cut by any one of the pairs of cutter wheels 20, 21 the cut portion 44 (shown in phantom in FIG. 1) which overrides the rim of cutter wheel 21 passes through the upper slot 37 and the cut portion 45 (shown in phantom in FIG. 1) which underrides the rim of cutter wheel 20 passes through the slot 36. As will be apparent from FIG. 4, looking from the direction of the element 28, the lower slot 36 is on the same axial side as the upper wheel 20 and the upper slot 37 is on the same axial side as the lower wheel 21 with reference to the common plane 38 which is defined by or passes through the abutting cutting edges, 20a, 21a. Thus, the upper slot 37 faces substantially the upper rim of the lower cutting wheel 21 and the lower slot faces the lower rim of the upper cutting wheel 20.

By this arrangement as the metal is cut, the portion which passes under the rim of the upper cutting wheel 20 passes without tearing, or any substantial bending or distortion, through the slot 36; similarly the cut portion which passes over the upper rim of the cutting wheel 21 passes through the upper slot 37 with a similar lack of distortion, tearing, or spreading. The bearing assembly serves to absorb the forces of separation directly at the axial position where these forces are strongest. Accordingly, the forces which might otherwise tend to spread the shafts 10, 11 one from the other are largely absorbed by the bearings 30, 31 and bearing assembly 26. Therefore, the bearing assembly 26 tends to maintain the shafts 10, 11 in parallel alignment, which therefore tends to retain the cutting edges in proper position and reduce wear upon the cutting edges 20a, 21a, as well as wear upon the journal bearings.

The arrangement of the cutter with one or more bearing assemblies therefore provides a desirable flexibility in the positioning of the cutters 20, 21 and in the positioning of the one or more corresponding bearing assemblies 26. No difficult disassembly of any of the parts is required, since the bearing assembly is readily positioned as desired by the loosening or removing of the cantilevered bearings 30, 31 from the support post.

What is claimed is:

1. A cutter for cutting a workpiece of sheet metal or the like comprising:
    a pair of shafts having parallel axes, and each being journalled at spaced axial points,
    a pair of cutter wheels having circular abutting cutting edges in a common radial plane and mounted respectively on said shafts between said journals for cutting the workpiece as the workpiece passes from one side to the other of, and between, said shafts,
    a support element on said other side of said wheels,
    a pair of bearings for said shafts cantilevered to said element and each applied to its respective shaft axially adjacent the cutter wheel on its respective shaft and radially opposite the cutter wheel on the other shaft, to resist forces of separation of the shafts,
    said element having a pair of slots each open respectively from opposite axial sides of the element, and each extending in the axial direction at least to the common radial plane of the cutting edges, and so related that when the axes of said wheels lie in a vertical plane, the upper slot is on the same side of the element in the axial direction relative to said common plane as the lower wheel, and the lower slot is on the same side in the axial direction relative to said common plane as the upper wheel.

2. A cutter as claimed in claim 1, said slots extending in the axial direction beyond said common plane.

3. A cutter as claimed in claim 1, said bearings being cantilevered from said element by a pair of arms respectively connected to said element.

4. A cutter as claimed in claim 2, said shafts being cylindrical, and the bearings having bearing surfaces not exceeding 180° in extent and facing a central line between said axes.

5. A cutter as claimed in claim 4, said bearings being cantilevered from said element by a pair of arms connected to said element and respectively connected to said bearings.

6. A cutter as claimed in claim 5, said arms being removably connected to said element.

7. A cutter as claimed in claim 5, said bearings each comprising an insert of low friction material.

8. A cutter as claimed in claim 7, said inserts being graphite.

9. A bearing assembly for a cutter for sheet metal or the like of the type comprising a pair of shafts each journalled in axially spaced journals and with parallel axes and carrying respectively a pair of cutter wheels having respective circular cutter edges mounted in abutting relation, said assembly comprising:
a pair of partial bearings respectively for said shafts,
a support element from which said bearings are cantilevered,
each bearing being positioned relative to the other so that when each is applied to its respective shaft it will lie axially adjacent the wheel on its respective shaft and radially opposite the wheel on the other shaft, to resist forces of separation of said shafts when cutting occurs.

10. A bearing assembly as claimed in claim 9, each said bearing having a cylindrical surface.

11. A bearing assembly as claimed in claim 10, said bearings not exceeding 180° in circumferential extent to afford in open face, the open faces of each bearing radially facing the other shaft.

12. A bearing assembly as claimed in claim 11, the bearings being cantilevered from said support element by a pair of arms respectively connected to said element.

13. A bearing assembly as claimed in claim 9, said element having a pair of slots extending in the axial direction from opposite sides of the element at least to a common radial plane between the bearings, to allow unimpeded passage of the cut portions of the sheet metal or the like during use.

14. A bearing assembly as claimed in claim 13, said slots extending beyond said common radial plane.

15. A bearing assembly as claimed in claim 12, said arms being removably connected to said element.

16. A bearing assembly as claimed in claim 9, said element having a pair of slots extending from opposite sides of the element in an axial direction beyond a common plane between the bearings, said slots being related so that when said shaft axes lie in a vertical plane, the upper slot extends from the same axial side as the lower wheel, and the lower slot extends from same axial side as the upper wheel, relative to said common plane, and the slots overlap horizontally and are off-set vertically to allow unimpeded passage of the cut portions of the sheet metal or the like during use.

17. A bearing assembly as claimed in claim 9, each said element having a pair of slots, each said slot extending axially from a different side of the element than the other relative to, and extending at least to, a common radial plane between the wheels and each slot displaced respectively from the other, so that if the axes lie in a vertical plane with one wheel higher than the other, the upper slot extends from the side nearest the lower wheel, and the lower slot extends from the side nearest the upper wheel.

18. A bearing assembly as claimed in claim 13, each of said slots extending beyond said common plane, thereby to afford between the slots a web which joins the remaining two portions of the element.

19. In a sheet metal slitter having a pair of parallel shafts each journalled at its axial extremities and cooperatively carrying a pair of juxtaposed cutting elements which peripherally overlap to define a cutting nip therebetween, the improvement of means preventing radial separation of the shafts during cutting and comprising a tension element aligned with the nip to bridge the same, said tension element lying in a plane parallel to a plane through the axes of said shafts and at a distance from the shafts greater than the radii of said cutting elements, a pair of cantilevered bearing elements secured to said tension element and each projecting therefrom toward one of said shafts, each such bearing element having an arcuate shaft-contacting bearing surface contacting the adjacent shaft in opposition to the cutting nip and in radial alignment with the cutting element on the other shaft, and said tension element having therein a pair of medially located, oppositely directed notches which are substantially radially aligned with the cutting nip for receiving the cut sheet metal portions issuing from the nip during operation of the slitter.

20. In a sheet metal slitter having a pair of parallel shafts each journalled at its axial extremities and cooperatively carrying a pair of juxtaposed cutting elements which peripherally overlap to define a cutting nip therebetween the improvement of means preventing radial separation of the shafts during cutting and comprising tension element aligned with the nip to bridge the same, said tension element lying in a plane parallel to a plane through the axes of said shafts and at a distance from the shafts greater than the radii of said cutting elements, and a pair of cantilevered bearing elements secured to said tension element and each projecting therefrom toward one of said shafts, each such bearing element having an arcuate shaft-contacting bearing surface contacting the adjacent shaft in opposition to the cutting nip and in radial alignment with the cutting element on the other shaft.

* * * * *